United States Patent [19]
Trudeau

[11] Patent Number: 5,987,401
[45] Date of Patent: Nov. 16, 1999

[54] LANGUAGE TRANSLATION FOR REAL-TIME TEXT-BASED CONVERSATIONS

[75] Inventor: John R. Trudeau, Foster City, Calif.

[73] Assignee: Apple Computer, Inc., Cupertino, Calif.

[21] Appl. No.: 08/569,360

[22] Filed: Dec. 8, 1995

[51] Int. Cl.⁶ .................................................. G06F 17/28
[52] U.S. Cl. ...................................... 704/2; 704/8; 704/3
[58] Field of Search .................................. 704/2, 7, 8, 9, 704/277; 395/753

[56] References Cited

U.S. PATENT DOCUMENTS

| | | | |
|---|---|---|---|
| 4,731,735 | 3/1988 | Borgendale et al. | 704/2 |
| 5,075,850 | 12/1991 | Asahioka et al. | 704/2 |
| 5,175,684 | 12/1992 | Chong | 704/2 |
| 5,268,839 | 12/1993 | Kaji | 704/3 |
| 5,295,068 | 3/1994 | Nishino et al. | 704/2 |
| 5,434,776 | 7/1995 | Jain | 704/8 |
| 5,568,383 | 10/1996 | Johnson et al. | 704/9 |
| 5,583,761 | 12/1996 | Chou | 395/798 |
| 5,675,817 | 10/1997 | Moughanni et al. | 395/753 |
| 5,715,466 | 2/1998 | Flanagan et al. | 704/2 |

FOREIGN PATENT DOCUMENTS

449230 A2   3/1991   European Pat. Off. ........ G06F 15/38

OTHER PUBLICATIONS

Lu, Cary and Milligan, John, "e–World, The Official Guide for Macintosh Users", Hayden Books, Indiana, 1994.
Investor's Business Daily, Nov. 6, 1995 (Inv. Bus. Daily A25, 1995 WL 11378428).

*Primary Examiner*—Joseph Thomas
*Assistant Examiner*—Patrick N. Edouard
*Attorney, Agent, or Firm*—Beyer & Weaver, LLP

[57] ABSTRACT

A real-time language translation technique for text-based conversations. The messages forming the text-based conversation amongst a plurality of participants to the conversation are translated in real-time either from a user language to a conversation language of the conversation, or from the conversation language to the user language. The result is that the user is able to seamlessly converse in a text-based conversation (in the conversation language) using a language other than the conversation language. The invention is particularly advantageous for on-line text-based conversations, wherein users of on-line text-based conversations are able to seamlessly converse with each other in different languages.

15 Claims, 11 Drawing Sheets

LANGUAGE TRANSLATION FOR REAL-TIME TEXT-BASED CONVERSATIONS

BACKGROUND OF THE INVENTION

1. Field of the Invention

The present invention relates to on-line conversations, and more particularly, to multilingual on-line conversations.

2. Description of the Related Art

Many on-line service providers, such as Apple's world and various Internet service providers, allow users or subscribers to converse in real time using text Such conversations are held in "chat rooms." Users are able to log into and out of a chat room as they like. To enter a particular chat room, the user's computer electronically connects to an on-line service provider's host computer which provides the chat service. Once connected, the user is able to enter (i.e., log into) any of a number of chat rooms being supported by the chat service. Those users logged into a chat room are able to see any message typed and sent by any of the other members logged into the chat room. The on-line services also offer the ability to send real-time messages in a one-on-one mode, where a message is targeted to a specific user who is currently on-line.

One significant problem with existing on-line chat services is that all participants to a conversation (within a chat room) must share a common language. The common language is customarily English in as much as most people involved with computers have at least a minimum fluency in English. However, since these on-line services are available on a global basis, non-English speaking people are at a distinct disadvantage when using on-line chat services. Although conversations in other specific languages can be initiated, the problem remains that those who are not sufficiently fluent to converse in that language are placed at a disadvantage.

Although computer-based translation of documents and files is available today to convert such documents and files from one language to another language. However, such computer-based translation is unsuitable for on-line chat services or message-based conversations which do not involve documents or files.

Hence, there is a need to provide on-line services such that international, real-time, text-based conversations can be had between two or more users who themselves use different languages to converse.

SUMMARY OF THE INVENTION

Broadly speaking, the invention relates to a real-time language translation technique for text-based conversations. The messages forming the text-based conversation amongst a plurality of participants to the conversation are translated in real-time either from a user language to a conversation language of the conversation, or from the conversation language to the user language. The result is that the user is able to seamlessly converse in a text-based conversation (in the conversation language) using a language other than the conversation language. The invention is particularly advantageous for on-line text-based conversations, wherein users of on-line text-based conversations are able to seamlessly converse with each other in different languages.

The invention can be implemented in numerous ways, including as a system, a method, or as a computer readable medium.

As a system for supporting multilingual text-based conversations over a network of computers, an embodiment of the invention includes: a conversation processor, residing in at least one of the computers, for electronically sending and receiving text-based messages over the network; and a translation control processor, residing in at least one of the computers, for translating a text-based message from a first language to a second language. The text-based messages are associated with a conversation, preferably an on-line conversation.

As a computer-implemented method for providing multilingual text-based conversations over a network of computers, an embodiment of the invention performs the operations of: identifying a conversation group of users of certain of the computers within the network, the users of the conversation group participating in a text-based on-line conversation in a conversation language; providing an outgoing message in a user language from one of the users in the conversation group; determining whether the user language is the same as the conversation language; translating the outgoing message from the user language to the conversation language when the conversation language is not the same as the user language; and subsequently transmitting the outgoing message to the certain of the computers associated with the users of the conversation group.

As a computer-implemented method for providing multilingual text-based conversations over a network of computers, another embodiment of the invention performs the operations of: identifying a conversation group of users of certain of the computers within the network, the users of the conversation group participating in a text-based on-line conversation in a conversation language; receiving an incoming message in a conversation language from one of the users in the conversation group; determining whether the conversation language of the incoming message is the same as a user language of a particular user within the conversation group; translating the incoming message from the conversation language to the user language for the particular user when the conversation language is not the same as the user language; and subsequently displaying the incoming message to the particular user.

As a computer readable medium containing program instructions for providing multilingual text-based conversations over a network of computers, an embodiment of the invention includes: computer readable code devices for providing a conversation group of users of certain of the computers within the network, the users of the conversation group participating in a text-based on-line conversation in a conversation language; computer readable code devices providing an outgoing message in a user language from one of the users in the conversation group; computer readable code devices for translating the outgoing message from the user language to the conversation language when the conversation language is not the same as the user language; and computer readable code devices for subsequently transmitting the outgoing message to the certain of the computers associated with the users of the conversation group.

As a computer readable medium containing program instructions for providing multilingual text-based conversations over a network of computers, an embodiment of the invention includes: computer readable code devices for providing a conversation group of users of certain of the computers within the network, the users of the conversation group participating in a text-based on-line conversation in their own user language; computer readable code devices providing an outgoing message in a user language; computer readable code devices for translating the outgoing message from the user language to an intermediate language; and computer readable code devices for subsequently transmitting the outgoing message to the certain of the computers associated with the users of the conversation group.

An advantage of the invention is that user are able to communicate in text-based conversations on an international level without language barriers. Each member of the conversation no longer needs to understand the language in which the conversation is held. A user can select his or her own language and converse with the other members of the conversation as though he or she was fluent in the conversation language. Also, the necessary language translation is performed in essentially real-time so that the user requiring translation is not hindered.

Other aspects and advantages of the invention will become apparent from the following detailed description, taken in conjunction with the accompanying drawings, illustrating by way of example the principals of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to the drawings. However, those skilled in the art will readily appreciate that the detailed description given herein with respect to these figures is for explanatory purposes as the invention extends beyond these limited embodiments.

The invention relates to a real-time language translation technique for text-based conversations. The messages forming the text-based conversation amongst a plurality of participants to the conversation are translated in real-time either from a user language to a conversation language of the conversation, or from the conversation language to the user language. The result is that the user is able to seamlessly converse in a text-based conversation (in the conversation language) using a language other than the conversation language. The invention is particularly advantageous for on-line text-based conversations, wherein users of on-line text-based conversations are able to seamlessly converse with each other in different languages.

An advantage of the invention is that user are able to communicate in text-based conversations on an international level without language barriers. Each member of the conversation no longer needs to understand the language in which the conversation is held. A user can select his or her own language and converse with the other members of the conversation as though he or she was fluent in the conversation language. Also, the necessary language translation is performed in essentially real-time so that the user requiring translation is not hindered.

As an example of the usefulness of the invention, consider a text-based conversation initiated and sustained on-line between English-speaking individuals and Spanish-speaking individuals logged onto the on-line service which supports conversations. Here, the English-speaking individual would type in an English message, and the message would be translated from English to Spanish and then sent to the machines of the Spanish-speaking individuals in Spanish When the Spanish-speaking individual types in and sends a Spanish message, the Spanish message would be received by the machines of the English speaking individuals and then translated and displayed in English. In this example, it is assumed that the language of the conversation (i.e., the language used in the chat room) is Spanish and that certain members are conversing directly in Spanish and others are conversing in English by way of a translation technique that is seamlessly converting from English-to-Spanish and Spanish-to-English. Of course, languages other than Spanish and English, such as German, French, Italian and others, may be used. However, given the dominance of the use English in computers, in many cases, English will likely be one of the languages used.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated.

Further, the manipulations performed are often referred to in terms, such as producing, identifying, determining, or comparing. In any of the operations described herein that form part of the present invention, these operations are useful machine operations. The invention also relates to an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the apparatus will appear from the description given below.

Figure 1:
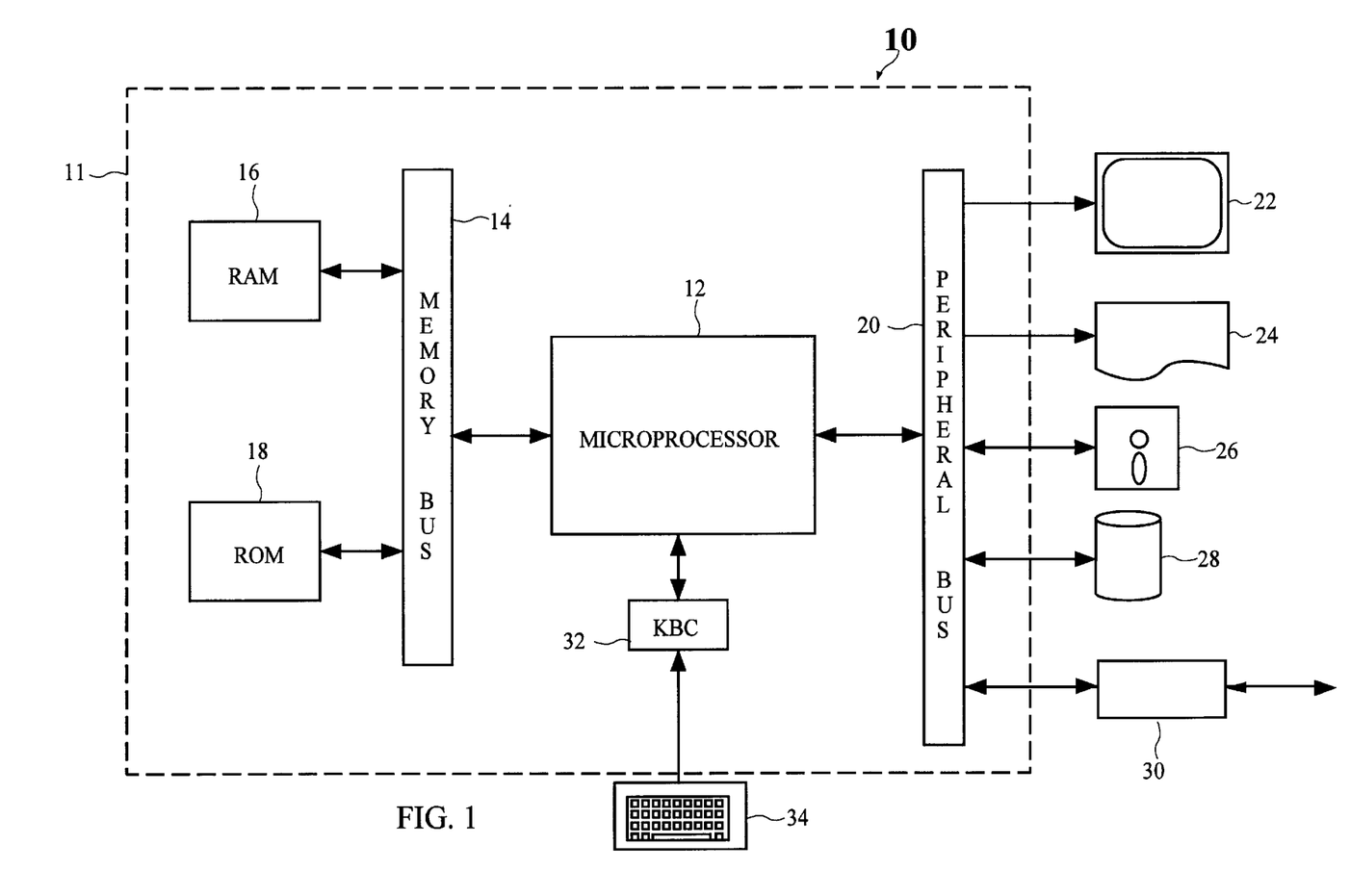
FIG. 1 is a block diagram of an exemplary computer system for translating conversations in real-time in accordance with the invention.

FIG. 1 is a block diagram of an exemplary computer system 10 for a translating conversations in real-time in accordance with the invention. The computer system 10 includes a digital computer 11, a display screen (or monitor) 22, a printer 24, a floppy disk drive 26, a hard disk drive 28, a network interface 30, and a keyboard 34. The digital computer 11 includes a microprocessor 12, a memory bus 14, random access memory (RAM) 16, read only memory (ROM) 18, a peripheral bus 20, and a keyboard controller 32. The digital computer 11 can be a personal computer (such as an IBM compatible personal computer), a workstation computer (such as a Sun Microsystems or Hewlett-Packard workstation), or some other type of computer.

The microprocessor 12 is a general purpose digital processor which controls the operation of the computer system 10. The microprocessor 12 can be a single-chip processor or can be implemented with multiple components. Using instructions retrieved from memory, the microprocessor 12 controls the reception and manipulation of input data and the output and display of data on output devices. According to the invention, a particular function of microprocessor 12 is to perform real-time language translation for text-based conversations (in particular, on-line text-based conversations).

The memory bus 14 is used by the microprocessor 12 to access the RAM 16 and the ROM 18. The RAM 16 is used by the microprocessor 12 as a general storage area and as scratch-pad memory, and can also be used to store input data and processed data. The ROM 18 can be used to store instructions or program code followed by the microprocessor 12 as well as image descriptions and character outlines used to display images. Alternatively, such image descriptions and character outlines can be included in ROM or RAM within an output device.

The peripheral bus 20 is used to access the input, output, and storage devices used by the digital computer 11. In the described embodiment, these devices include the display screen 22, the printer device 24, the floppy disk drive 26, the hard disk drive 28, and the network interface 30. The keyboard controller 32 is used to receive input from keyboard 34 and send decoded symbols for each pressed key to microprocessor 12 over bus 33.

The display screen 22 is an output device that displays images of data provided by the microprocessor 12 via the peripheral bus 20 or provided by other components in the computer system 10. In the described exemplary embodiment, the display screen 22 is a raster device which displays images on a screen corresponding to bits of a bitmap in rows and columns of pixels. That is, a bitmap can be input to the display screen 22 and the bits of the bitmap can be displayed as pixels. An input bitmap can be directly displayed on the display screen 22, or components of computer system 10 can first render codes or other image descriptions from a page description file into bitmaps and send those bitmaps to be displayed on the display screen 22. Raster display screens such as CRT's, LCD displays, etc. are suitable for use as the display screen 22. FIGS. 8A–8D illustrate examples of user interface windows (i.e., display images) for use with the invention.

The printer device 24 when operating as a printer provides an image of a bitmap on a sheet of paper or a similar surface. The printer 24 can be a laser printer, which, like display screen 22, is a raster device that displays pixels derived from bitmaps. The printer device 24 can also print images derived from coded data such as found in a page description language file. Other output devices such as a plotter, typesetter, etc. can be used in place of, or in addition to, the printer device 24.

The floppy disk drive 26 and the hard disk drive 28 can be used to store messages, bitmaps, image descriptions (coded data), and character outlines, as well as other types of data. The floppy disk drive 26 facilitates transporting such data to other computer systems, and hard disk drive 28 permits fast access to large amounts of stored data.

The microprocessor 12 together with an operating system (not shown) operate to execute computer code and produce and use data. The computer code and data may reside on the RAM 16, the ROM 16, or the hard disk drive 28. The computer code and data could also reside on a removable program medium and loaded or installed onto the computer system 10 when needed. Removable program mediums include, for example, CD-ROM, PC-CARD, floppy disk and magnetic tape.

The network interface 30 is used to send and receive data over a network connected to other computer systems. An interface card or similar device and appropriate software implemented by the microprocessor 12 can be used to connect the computer system 10 to an existing network and transfer data according to standard protocols.

The keyboard 34 is used by a user to input commands and other instructions to the computer system 10. Images displayed on the display screen 22 or accessible to the computer system 10 can be edited, searched, or otherwise manipulated by the user by inputting instructions on the keyboard 34. Other types of user input devices can also be used in conjunction with the present invention. For example, pointing devices such as a computer mouse, a track ball, a stylus, or a tablet can be used to manipulate a pointer on a screen of a general-purpose computer.

Figure 2:
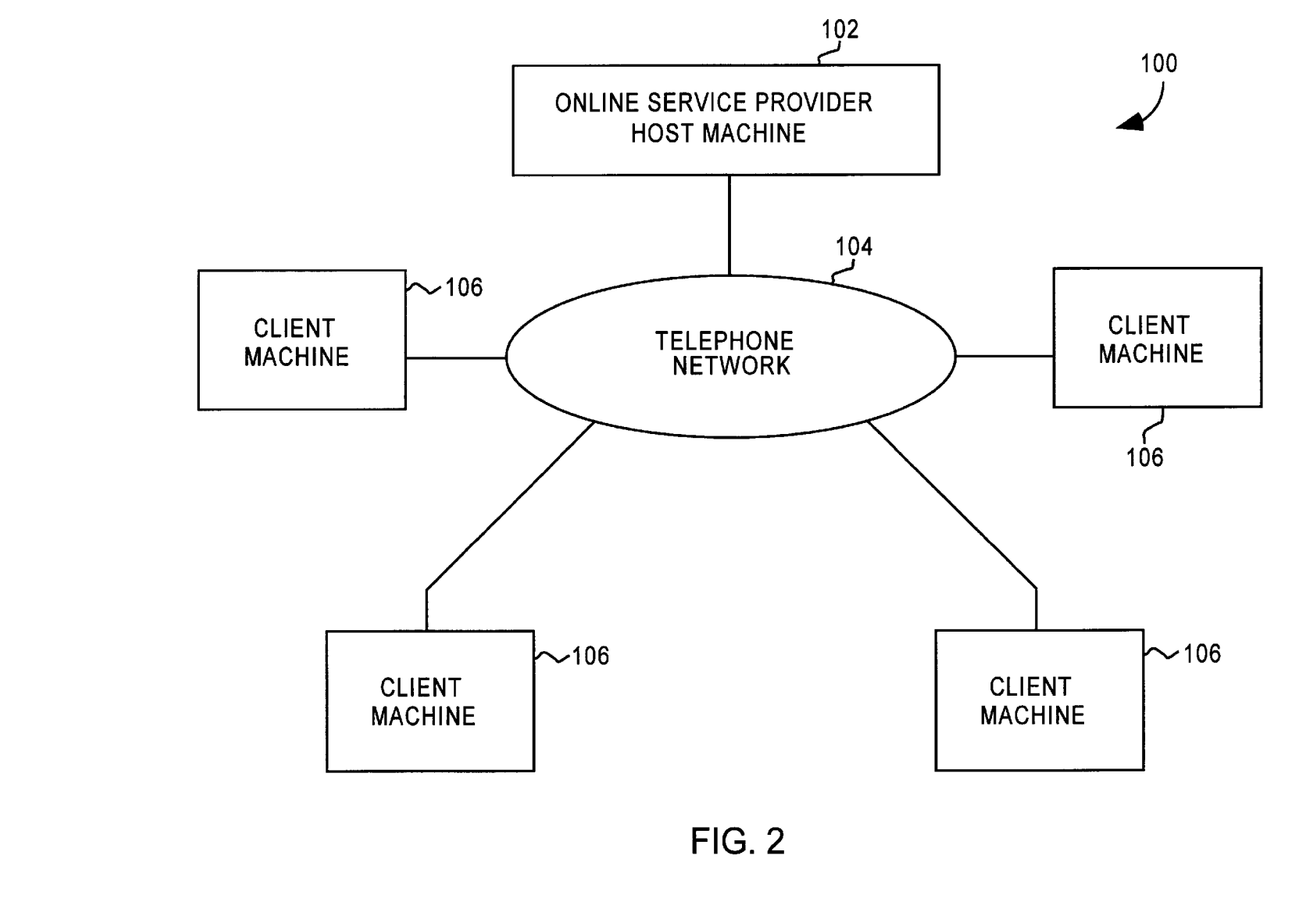
FIG. 2 is a schematic diagram of an on-line service system.

FIG. 2 is a schematic diagram of an on-line service system 100 according to a first arrangement The on-line service system 100 includes an on-line service provider host machine 102 that acts as a server to provide the on-line services to users. The on-line service provider host machine 102 is coupled to a telephone network 104. Also connected to the telephone network 104 are a plurality of client machines 106. Hence, the telephone network acts as the interconnecting backbone structure. The on-line service provider host machine 102 and the client machines 106 are preferably computers, such as general purpose computers or work station computers. It should be realized that the network interconnecting the on-line service provider host machine 102 with the client machines need not be the telephone network 104, but could alternatively be any other network (e.g., local area network, wide area network) suitable for interconnecting computers. The network could also use high speed data links.

Figure 3:
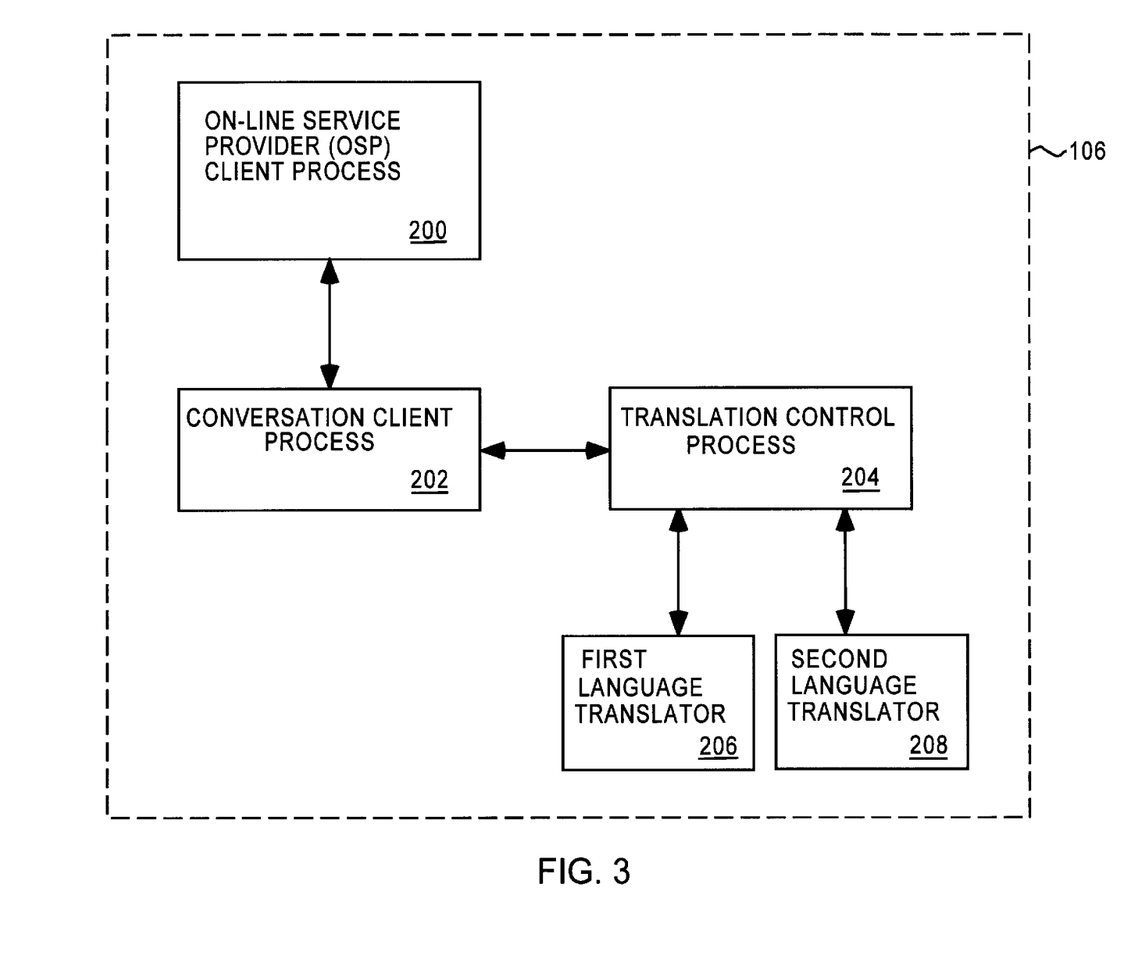
FIG. 3 is a functional block diagram of a client machine according to an embodiment of the invention.

FIG. 3 is a functional block diagram of the client machine 106 illustrated in FIG. 2 according to an embodiment of the invention. The client machine 106 according to the invention functions or operates to provide real-time, multilingual conversations between two or more of the client machines 106 via the telephone network 104 and the on-line service provider host machine 102. Preferably, the client machine 106 is a computer, such as the general purpose computer 10 illustrated in FIG. 1.

The particular operations provided by the client machine 106 according to an embodiment of the invention are illustrated in FIG. 3 and discussed below. Other operations performed by the client machine 106 are conventional and well known in the art.

The client machine 106 includes an on-line service provider (OSP) client process 200. The OSP client process 200 is resident in the client machine 106 and operates to control the on-line conversation service at the client machine 106 and communicates with the on-line service provider host machine 102 to effectively implement the on-line conversation service. A conversation client process 202 is operatively connected to the OSP client process 200 and operates to process incoming and outgoing textual messages in accordance with the invention so that real-time, multilingual conversations can be implemented The conversation client process 202 is operatively connected to a translation control process 204. The translation control process 204 determines whether a message (either incoming or outgoing) requires translation, and if translation is required, forwards the message to the appropriate language translator. In the embodiment of the invention illustrated in FIG. 3, first and second language translators 206 and 208 are illustrated. The first language translator 206 and the second language translator 208 are operatively connected to the translation control process 204. For example, in the case of an English speaking (non-Spanish speaking) user, if the first language translator 206 performs an English-to-Spanish translation, and the second language translator 208 performs a Spanish-to-English translation, then the translation control process 204 would send an outgoing English message destined to a conversation held in Spanish to the first language translator 206, and would send an incoming message from the Spanish conversation to the second language translator 206 so that the user of the client machine 106 would see the incoming message as English even though the on-line conversation is held in Spanish. Although the embodiment illustrated in FIG. 3 shows only the first and second translators 206 and 108, these translators and perhaps many others can be provided. Also, the translators are preferably translation processes, either multiple individual translation processes or a common translation process. These translation processes can also be combined with the translation control process 204.

Figure 4:
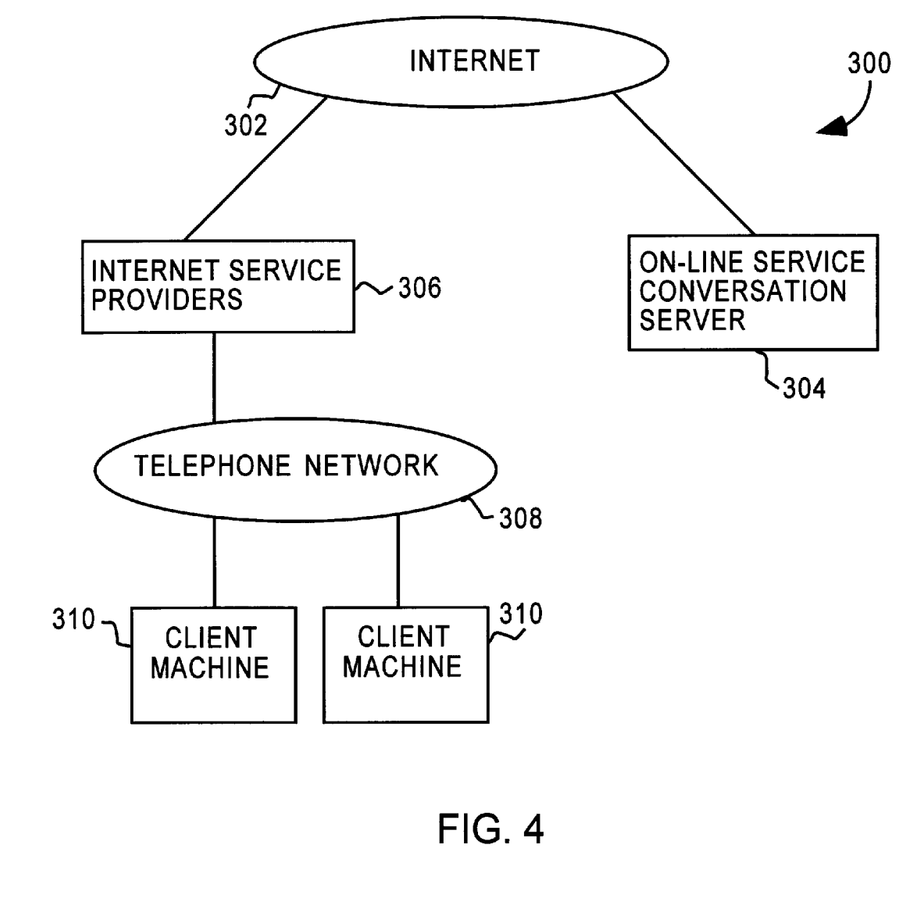
FIG. 4 is a schematic diagram of another on-line service system.

FIG. 4 is a schematic diagram of an on-line service system 300 according to a second arrangement. In this arrangement, the Internet 302 is the primary interconnecting backbone structure of the on-line service system 300. As is conventional, the Internet 302 includes various types of servers (e.g., HTFP, FTP, Telnet, Gopher). An on-line service conversation server 304 is operatively connected to the Internet 302 and operates to implement the real-time, multilingual conversation service. Also connected to the Internet 302 are numerous Internet service providers 306. Preferably, the Internet service providers 306 are connected to the Internet 302 via high-speed communication links. These Internet service providers 306 are also connected to a telephone network 308. A plurality of client machines 310 are connected to the telephone network 308. Typically, the client machines 310 are computers as discussed above and connect to the telephone network 308 via modems. It should be realized that the network interconnecting the on-line service provider host machine 306 with the client machines 310 need not be the telephone network 308, but could alternatively be any other network (e.g., local area network, wide area network) suitable for interconnecting computers. The network could also use high speed data links.

Hence, the client machines 310 are able to traverse the telephone network 308, the Internet service providers 306 and the Internet 302 to arrive at the on-line service conversation server 304 where the conversation service resides. Communications between the client machines 310 and the Internet service providers (ISP) is achieved using ISP communication access procedures required by the Internet service providers 306. Typically, the on-line service conversation server 304 uses Internet Relay Chat (IRC) to implement the conversation (chat) service.

Although the on-line service system 300 is illustrated in FIG. 4 as having only two client machines 310 and a single on-line service conversation server 304, it should be recognized that multiple conversation servers, Internet service providers, telephone networks and client machines can be provided and interconnected in numerous ways.

Figure 5:
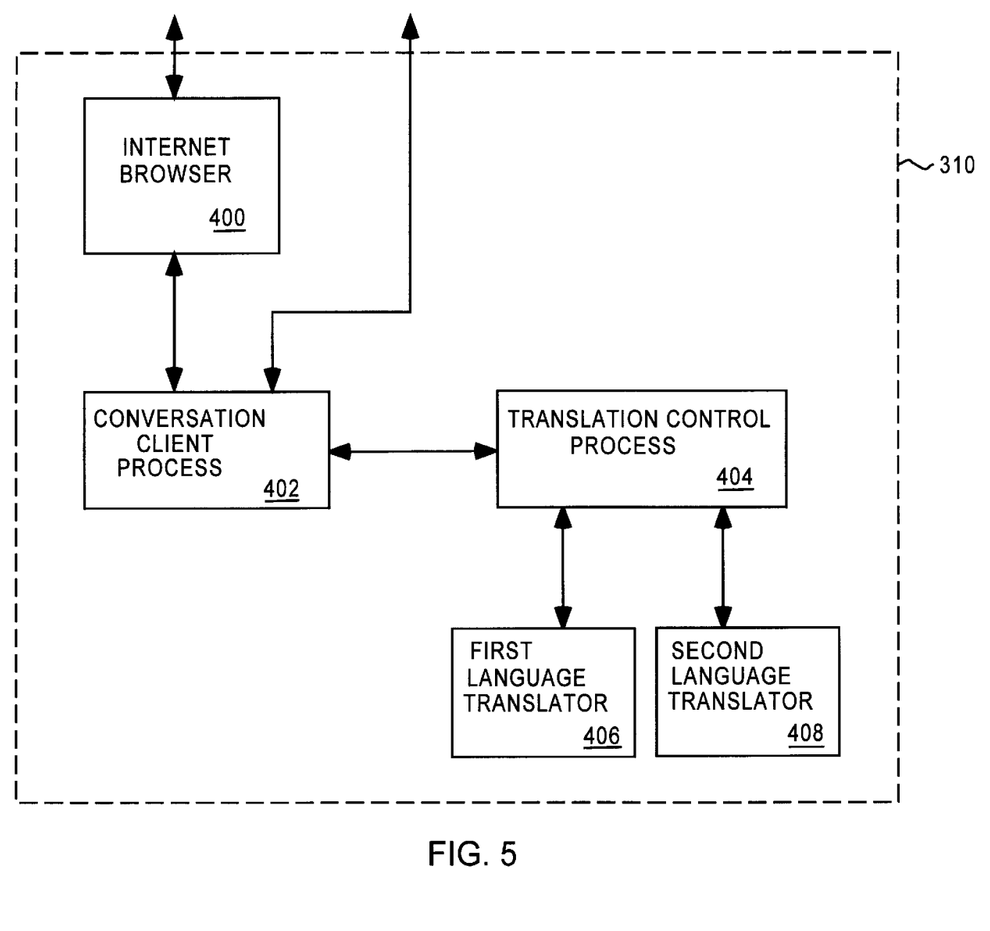
FIG. 5 is a block diagram of a client machines according to another embodiment of the invention.

FIG. 5 is a functional block diagram of the client machines 310 illustrated in FIG. 4 according to another embodiment of the invention. In particular, FIG. 5 illustrates operations implemented by the client machine 310 to provide real-time multilingual conversations over the on-line service system 300. However, generally speaking, the client machines 310 are computers that are able to implement many other conventional operations not illustrated in FIG. 5. Preferably, the client machine 310 is a computer such as the general purpose computer 10 illustrated in FIG. 1.

The particular operations provided by the client machine 310 according to an embodiment of the invention are illustrated in FIG. 5 and discussed below. Other operations performed by the client machine 310 are conventional and well known in the art.

The client machine 310 includes an Internet browser 400, a conversation client process 402, a translation control process 404 and first and second language translators 406 and 408. The Internet browser 400 enables the user of the client machine 310 to traverse or navigate through the Internet 302 as is well known in the art. In particular, the Internet browser 400 enables users of the client machines 310 to traverse or move through the Internet 302 so as to arrive at the on-line service conversation server 304. The conversation client process 402 controls the reception and transmission of incoming and outgoing messages from and to the on-line service conversation server 304. In this embodiment, the conversation client process 402 intracts with the on-line service conversation server 304 so that on-line conversations are facilitated and any necessary language translation of messages is carried out automatically.

It is assumed that once the user of the client machine 310 have traversed or navigated (using the Internet browser 400) to the on-line service conversation server 304, most of the messages bypass the Internet browser 400 and go directly to the conversation client process 402, until the conversation is terminated and control is returned to the Internet browser 400.

The translation control process 404 is invoked by the conversation client process 402 when a message has been received or a message is ready to be transmitted. The translation control process 404 then determines whether translation is needed, and if so, which of a plurality of language translators is appropriate to perform the language translation. In this embodiment, the first and second language translators 406 and 408 are provided for language translation, but it should be remembered that these translators and perhaps many others can be provided. Also, the translators are preferably translation processes, either multiple individual translation processes or a common translation process. These translation processes can also be combined with the translation control process 404.

The translated message is then returned to the conversation client process 402 where it is transmitted by the conversation client process 402 back to the on-line service conversation server 304 (via the telephone network 308, the Internet service providers 306 and the Internet 302). Thereafter, the on-line service conversation server 304 distributes the message to each of the other members within the particular group of users associated with the particular conversation.

At a client machine 310, an incoming message from the on-line service conversation server 304 is received at the conversation client process 402 of the client machine 310. The conversation client process 402 then invokes the translation control process 404 which in turn translates the message if necessary. The translated message is then returned to the conversation client process 402 where the translated message is displayed to the user on a display screen associated with the client machine 310.

Figure 6:
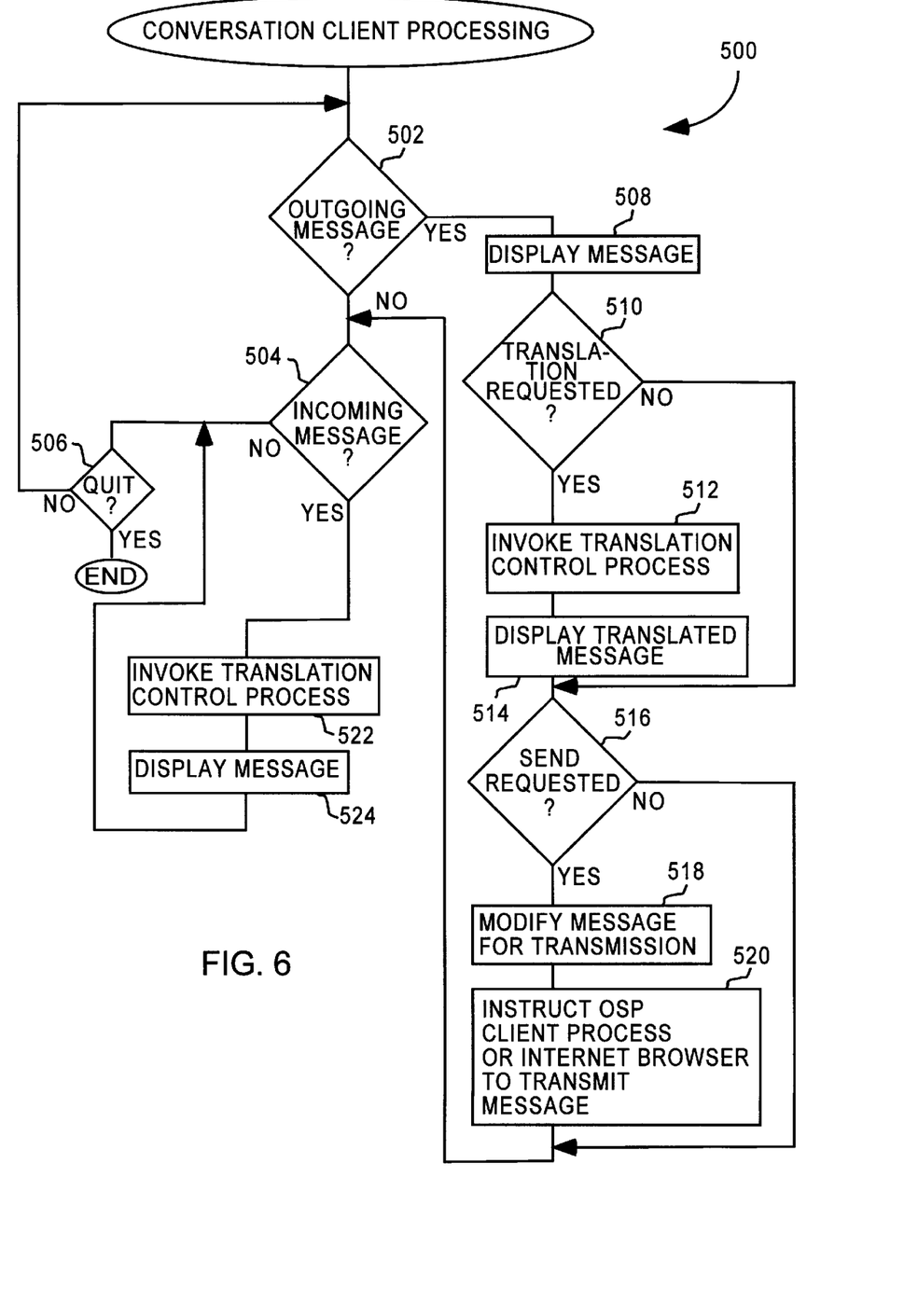
FIG. 6 is a flow chart of conversation client processing according to an embodiment of the invention.

FIG. 6 is a flow chart of a conversation client processing 500 according to an embodiment of the invention. Preferably, the operations of the conversation client processing 500 are implemented by the conversation client process 202 of FIG. 3 or the conversation client process 402 of FIG. 5.

The conversation client processing 500 begins with a decision 502 which determines whether an outgoing message has been prepared by the user for distribution to a conversation group (e.g., members of chat room). If there is no outgoing message present, a decision 504 determines whether an incoming message has been received. If an incoming message has not been received, a decision 506 determines whether the user has requested to end (i.e., quit) the conversation client processing 500. If the user has requested to end the conversation client processing 500, then the conversation client processing 500 ends. Otherwise, the processing returns to repeat the decision block 502 and subsequent blocks.

On the other hand, when the decision 502 determines that the user has prepared an outgoing message, the message is displayed 508 if not already being displayed. The creation of the outgoing message by a user is well known in the art. Preferably, the outgoing message is displayed 508 on a display screen associated with the client machine 106, 310 implementing the conversation client processing 500. Next, a decision 510 determines whether a translation is requested. Here, the user is preferably able to request whether they desire the outgoing message to be translated prior to being sent or simply just sent untranslated. If the user has requested translation, then the translation control process 204, 404 is invoked 512. The details on the translation control process 204, 404 are described below with respect to FIG. 7. However, in any case, the translation control process 204, 404 according to this embodiment returns a translated message. Then, the translated message which has been produced by the translation control process 204, 404 is displayed 514 to the user. The translated message is preferably displayed on a display screen associated with the client machine 106, 310 implementing the conversation client processing 500. On the other hand, when the user does not request translation, blocks 512 and 514 of the conversation client processing 500 are bypassed.

Next, following either block 514 when translation has been requested or block 510 when translation has not been requested, a decision 516 determines whether the user has requested that the message be sent. If the user has requested that the message be sent, then the message is modified 518 for transmission. For example, the typical modifications to the message for transmission include appending or prepending the untranslated message or language to be included in the message sent. The modifications may also require encoding some character sets into a form suitable for IRC or other conversation protocol utilized by the on-line service provider. For example, some character sets for languages (e.g., Japan) are encoded in two-byte character codes which would need to be encoded in one-byte codes since IRC supports only one-byte codes, the recipient would then need to decode the received codes.

Next the OSP client process 200 or the Internet browser 400 are instructed 520 to transmit the message. The message is transmitted to the on-line service provider host machine 102 in the case of the system 100 (FIG. 2) and to the on-line service conversation server 304 in the case of the system 300 (FIG. 4).

Thereafter, the conversation client processing 500 processes the decision block 504 and subsequent blocks. When the decision block 504 determines that an incoming message has been received, then the translation control process 204, 404 is invoked 522. The translation control process operates to translate the message as may be needed. The details of the operation of the translation control process 204, 404 are described in detail below with respect to FIG. 7. Next, the message is displayed 524. Typically, the message would have been translated so that the translated message would be displayed 524 to the user (via a display screen) in the language desired by the user. For example, if the incoming message is in English, but the user desires to converse in Spanish, then the incoming message would be converted to Spanish and then displayed. Following block 524, the conversation client processing 500 returns to the decision block 506.

Figure 7:
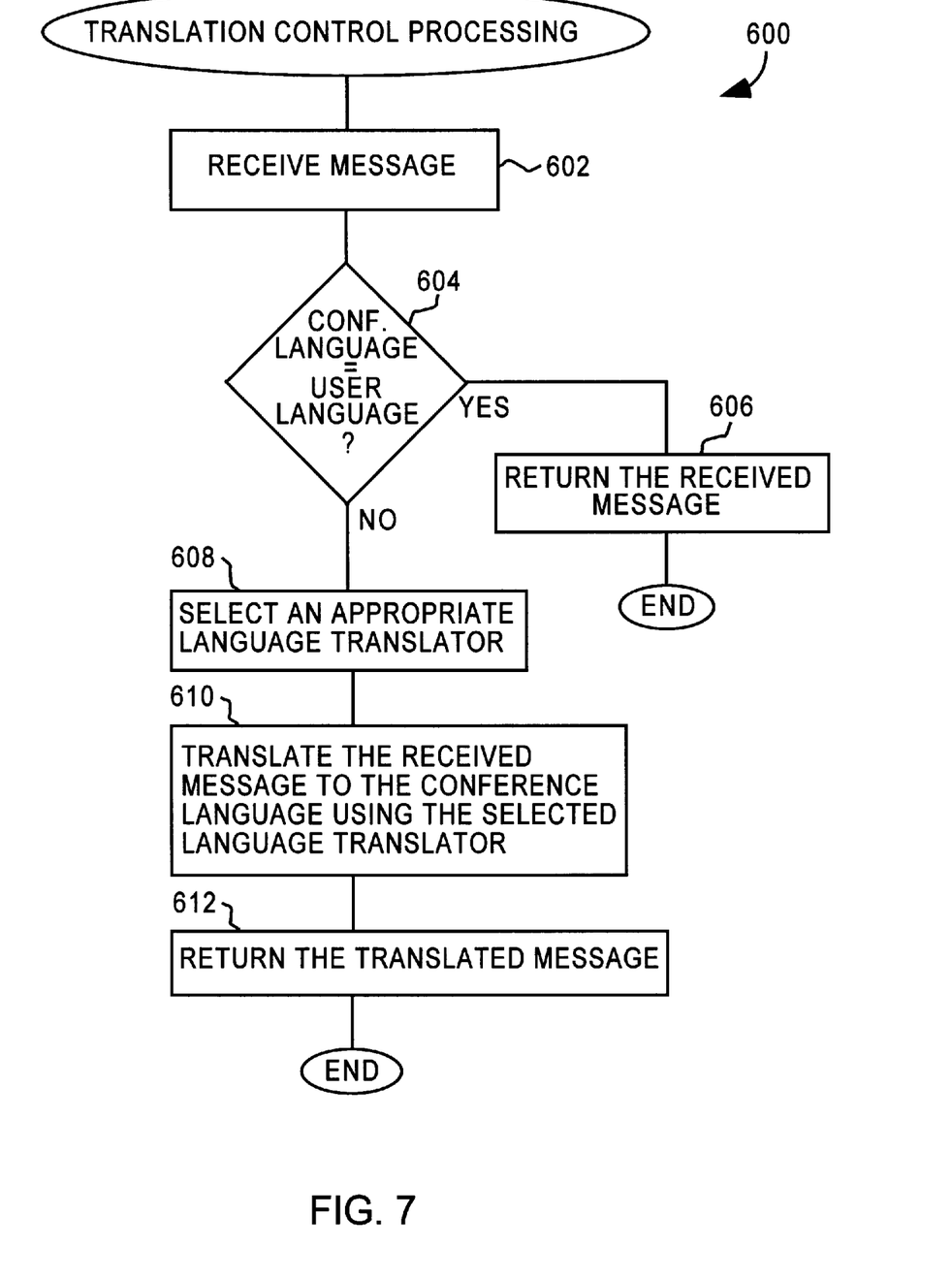
FIG. 7 is a flow chart of translation control processing in accordance with an embodiment of the invention.

FIG. 7 is a flow chart of translation control processing 600 in accordance with an embodiment of the invention. The translation control processing 600 is preferably carried out by the translation control process 204 in FIG. 3 and the translation control process 404 in FIG. 5.

The translation control processing 600 begins by receiving 602 a message. The message in this embodiment, may be either an incoming message or an outgoing message. A decision 604 then determines whether the conference language is the same as the user language. The conference language is the language that is being utilized by the conference, e.g., the language that is being utilized by the chat room. The user language, on the other hand, is the language that the user wishes to converse with. For example, the user language may be English and the conference language may be Spanish. Hence, if the decision 604 determines that the conference language and the user language are the same, then no translation is required; hence, the received message is returned 606 and the translation control processing 600 ends. On the other hand, if the decision 604 determines that the conference language is not the same as the user language, then the translation control processing 600 selects 608 an appropriate language translator for the translation. For example, if the conference language is Spanish and the user language is English, then for an outgoing message, the appropriate language translator selected 608 would be an English-to-Spanish translator. On the other hand, if the message is an incoming message, then the appropriate language translator selected 608 would be a Spanish-to-English translator. Next the received message is translated 610 to the conference language using the selected language translator. If the received message is an outgoing message, it is translated to the conference language. Alternatively, if the received message is an incoming message, it is translated to the user language. After the translation 610, the translated message is returned 612 to the conversation client process 202, 402. Following block 612, the translation control processing 600 is complete and ends.

In the above-described embodiments the client machines 106, 310 have included the means for implementing the operations of the invention. Nevertheless, those in the art should recognize that the operations of the invention could equally be provided at the host or server machine (e.g., the on-line service provider host machine 102 and the on-line service conversation server 304). The advantage is that host or server based operations are centralized and therefore available to all clients so that each client machine need not include the software or hardware to perform the operations (i.e., real-time language translation) associated with the invention. The trade-off is that the host or server is burdened with a large processing load in performing the providing real-time language translation for text-based conversations.

It should also be noted that the language translation would preferably focus on conversational language rather than language styles of written documents.

Figure 8A:
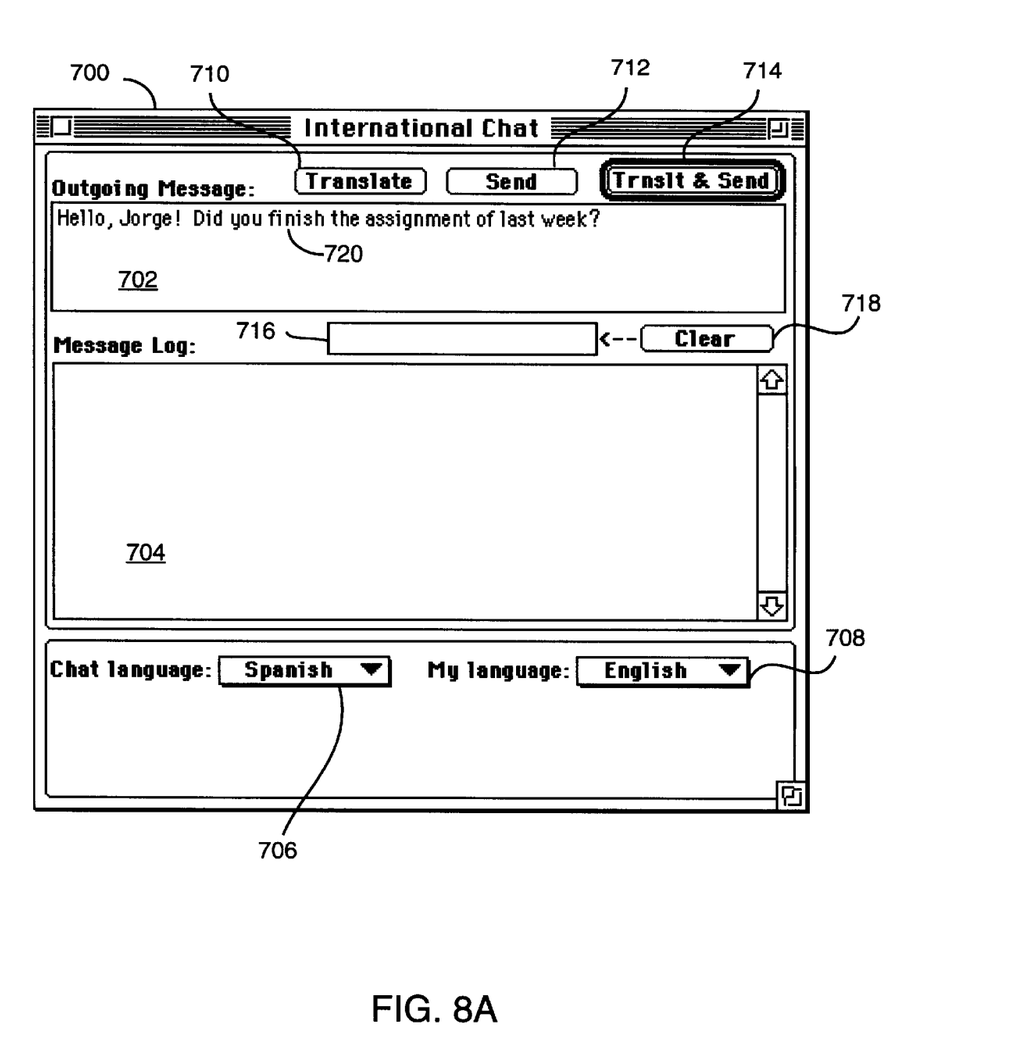
FIGS. 8A–8D are exemplary user interface windows for use with the invention.

FIGS. 8A–8D are exemplary user interface windows for use with the invention. In FIG. 8A, a user interface window 700 includes an outgoing message window 702, a message log window 704, a chat language selector 706, and a user language selector 708. A translate button 702, a send button 708 and a translate and send button 714 are associated with the outgoing message window 702. The translate and send button 714 is the combined effect of the translate button 702 and the send button 708. A message destination specifier 716 can be used to limit an outgoing message to a single user identified in the specifier 716. A clear button 718 operates to clear the specifier 716. When the specifier 716 is blank the outgoing message will be distributed or sent to all current members of the chat group (conversation). Otherwise, a specific member of the chat group can be designated in the message destination specifier 716 for one-to-one chat.

An exemplary operation of the invention using the user interface window 700 is described below with reference to FIGS. 8A–8D. The user interface window 700 is preferably presented to a user by a display screen such as the display screen 22 illustrated in FIG. 1. Initially, a user would log onto a chat group. At that time, the user would make language selections using the chat language selector 706 and the user language selector 708. In FIG. 8A, the user has selected Spanish as the chat language because that is presumably the language being utilized by the chat group, and the user has selected the user language to be English because presumably the user is not sufficiently fluent in Spanish to participate in the conversation. Thereafter, the user would read incoming messages from the message log window 704 and enter or type outgoing messages in the outgoing message window 702.

In the case in which the user enters or types an outgoing message 720 for the chat group (conversation) in the outgoing message window 702, the outgoing message 720 is simultaneously displayed in the outgoing message window 702. Note that in this example, the outgoing message 720 is in English which is the same as the selected user language.

Figure 8B:
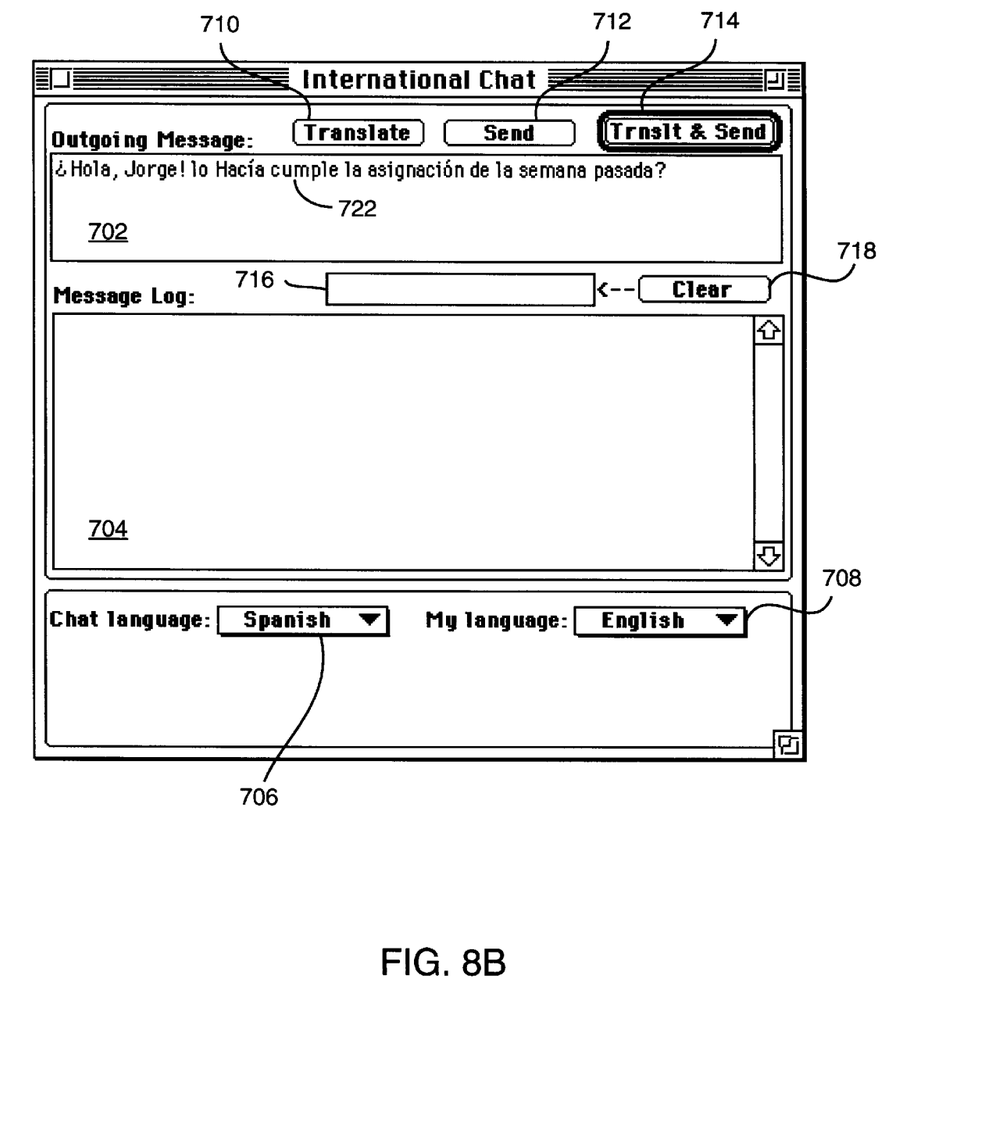

The user typically will then choose to translate the message before sending it to the chat group. For example, when the user clicks on the translate button 710, the above-described translation control processing is invoked. FIG. 8B illustrates the outgoing message window 702 of the user interface window 700 displaying the outgoing message 720 translated into a translated message 722.

Figure 8C:
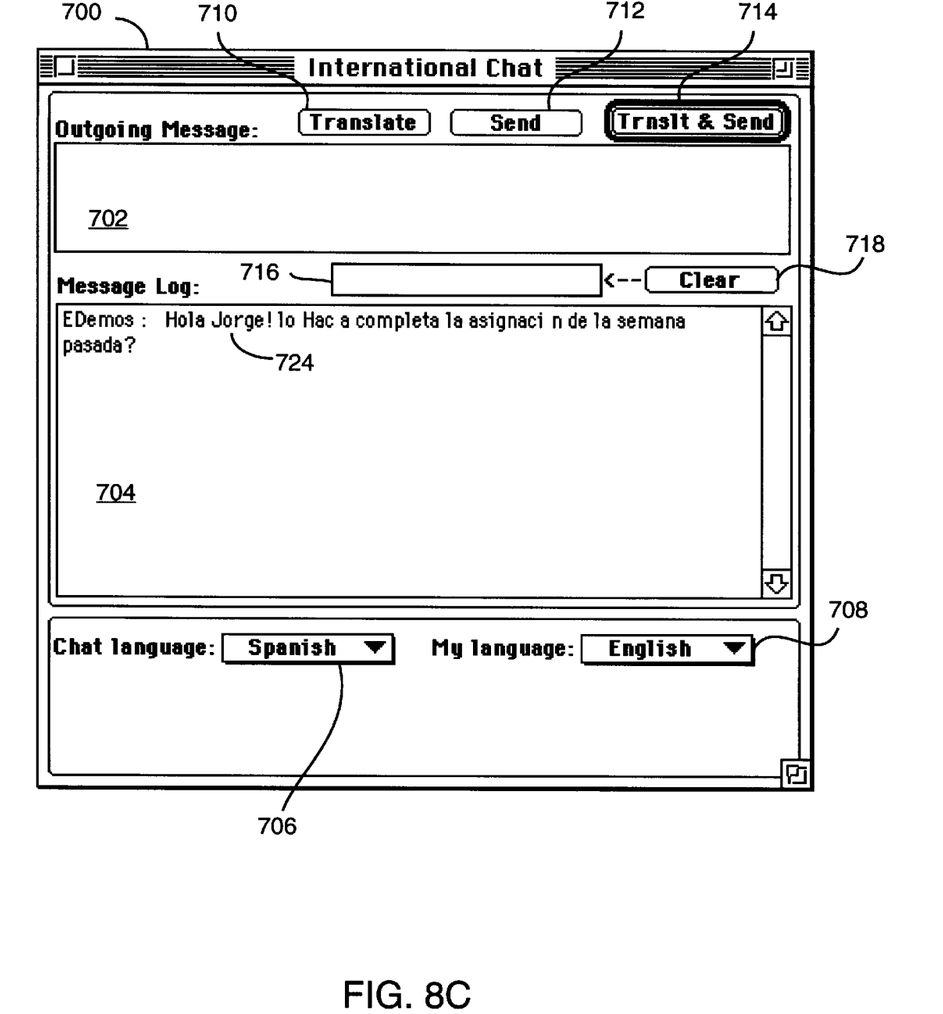

Once message is translated, the translated message 722 is ready to be sent to the chat group. When the send button 712 is clicked, the translated message 722 is sent to the chat group (via the OSP client process 200 or Internet browser 400). The translated message 722 is then received by a chat server (e.g., on-line service provider host machine 102 or on-line service conversation server 304) which forwards the translated message 722 to the appropriate chat room. The translated message 722 is then forwarded to each member of the chat group, including the creator of the message. FIG. 8C illustrates the forwarded message 724 being displayed in the message log window 704. Note that because the chat language is Spanish in this example, the forwarded message 724 is in Spanish, though the user could also translate the forwarded message to English.

Figure 8D:
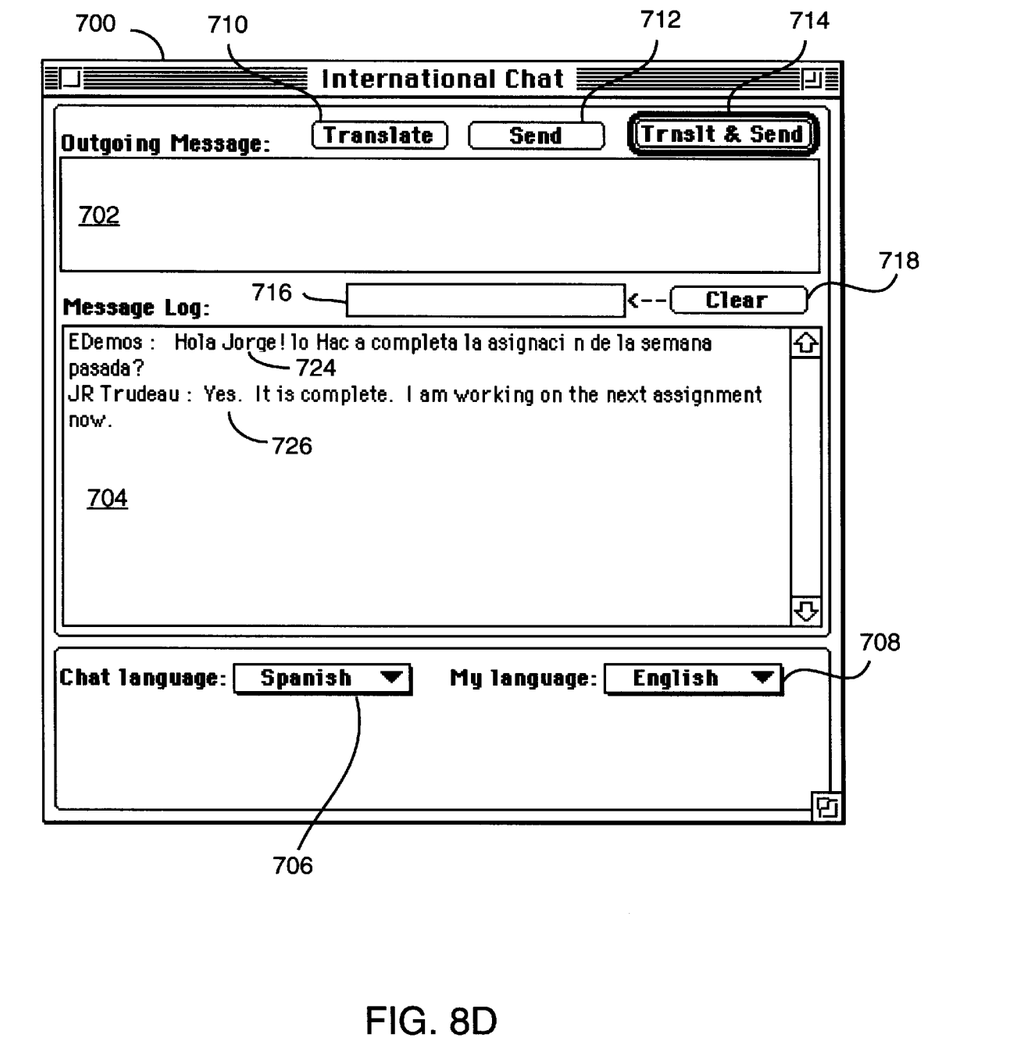

When an incoming message is received, it is in Spanish because that is the chat language. Hence, the incoming message is translated into English in accordance with the above-described translation control processing. The translated incoming message 726 is then displayed in the message log window 704 in English as illustrated in FIG. 8D.

Although the above embodiments were used with a conversation in which a conversation language was designated, the invention can also be used in situations were there is no specified conversation language. The message could be translated into a plurality of languages depending on the users logged into the conversation. The disadvantage with this approach is that numerous translators are required to translate between the various user languages that may be present. In another example, a message being sent to a conversation server could be encoded to an intermediate encoding. The intermediate could be a natural language or a non-natural language. Upon receiving the message, the user's machine would convert the message from the intermediate language to the user's language.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for providing multi-lingual text-based conversations over a network of computers, said method comprising:

(a) identifying a conversation group of users of certain of the computers within the network, all of the users of the conversation group participating in a common text-based on-line conversation in a conversation language;

(b) displaying a graphical control pertaining to available user languages on the computer of a user in the conversation group;

(c) selecting, by the user in the conversation group, a user language from the available user languages using the graphical control;

(d) providing an outgoing message in a particular user language from the user in the conversation group;

(e) determining whether the particular user language is the same as the conversation language;

(f) translating the outgoing message from the particular user language to the conversation language when the conversation language is not the same as the particular user language, said translating (f) includes at least selecting one of a plurality of translators based on the particular user language and the conversation language, and translating the outgoing message from the particular user language to the conversation language using the selected one of the translators; and (g) subsequently transmitting the outgoing message to the certain of the computers associated with each of the users of the conversation group, wherein the user in the conversation group is able to participate in the common text-based on-line conversation using the particular user language which is different than the conversation language in which the on-line conversation uses.

2. A computer-implemented method as recited in claim 1, wherein the network of computers includes a plurality of client computers and at least one host computer, and wherein said translating (f) is performed in the client computer for the user in the conversation group.

3. A computer-implemented method as recited in claim 1, wherein said method further comprises:

(h) receiving the transmitted outgoing message at the certain of the computers associated with the users of the conversation group as an incoming message in the conversation language; and (i) translating, for each of the users of the conversation group, the incoming message from the conversation language to the associated user language.

4. A method as recited in claim 1, wherein the network is the Internet, and wherein the conversation group for the common text-based conversation is an on-line chat group.

5. A method for providing multilingual text-based conversations over a network of computers, said method comprising:

(a) identifying a conversation group of users of certain of the computers within the network, all of the users of the conversation group participating in a common text-based on-line conversation in a conversation language, and each of the users of the conversation group having an associated user language;

(b) receiving an incoming message in a conversation language from one of the users in the conversation group;

(c) determining whether the conversation language of the incoming message is the same as a particular user language of a particular user within the conversation group;

(d) translating the incoming message from the conversation language to the particular user language for the particular user when the conversation language is not the same as the particular user language, said translating (d) includes at least selecting one of a plurality of translators based on the particular user language and the conversation language, and then translating the incoming message from the conversation language to the particular user language using the selected one of the translators; and (e) subsequently displaying the incoming message to the particular user using the particular user language, wherein the one of the users in the conversation group is able to participate in the common text-based on-line conversation using the particular user language which is different than the conversation language in which the on-line conversation uses.

6. A computer-implemented method as recited in claim 5, wherein the network of computers includes a plurality of client computers and at least one host computer, and wherein said translating (d) is performed in the client computer for the particular user in the conversation group.

7. A computer-implemented method as recited in claim 5, wherein said method further comprises:

(f) preparing a reply message to the displayed incoming message in the particular user language;

(g) displaying the reply message in the particular user language;

(h) translating the reply message from the particular user language to the conversation language when the particular user language is not the same as the conversation language; and (i) subsequently transmitting the translated reply message to the certain of the computers associated with each of the users of the conversation group.

8. A method as recited in claim 5, wherein the network is the Internet, and wherein the conversation group for the common text-based conversation is an on-line chat group.

9. A method for providing multilingual text-based conversations over a network of computers, said method comprising:

(a) identifying a conversation group of users of certain of the computers within the network, all of the users of the conversation group participating in a common text-based on-line conversation in a conversation language, and each of the users of the conversation group having an associated user language;

(b) receiving an incoming message in a conversation language from one of the users in the conversation group or an outgoing message in a user language from one of the users in the conversation group;

(c) determining whether the conversation language is the same as the user language of a user within the conversation group;

(d) when the incoming message is received, (d1) translating the incoming message from the conversation language to the user language when the conversation language is not the same as the user language, said translating includes at least selecting one of a plurality of translators based on the user language and the conversation language, and then translating the incoming message from the conversation language to the user language using the selected one of the translators, and (d2) then displaying the incoming message to the user; and (e) when the outgoing message is received, (e1) translating the outgoing message from the user language to the conversation language when the conversation language is not the same as the user language, said translating includes at least selecting one of a plurality of translators based on the user language and the conversation language, and then translating the incoming message from the user language to the conversation language using the selected one of the translators, and (e2) then subsequently transmitting the outgoing message to the certain of the computers associated with the users in the conversation group, wherein the users of the conversation group are able to participate in the common text-based on-line conversation using user languages which are different than the conversation language in which the on-line conversation uses.

10. A computer readable medium containing program instructions for providing multilingual text-based conversations over a network of computers, said computer readable medium comprising:

computer readable code devices for providing a conversation group of users of certain of the computers within the network, all of the users of the conversation group participating in a common text-based on-line conversation in a conversation language;

computer readable code devices for displaying a graphical control pertaining to available user languages on the computer of a user in the conversation group;

computer readable code devices for selecting, by the user in the conversation group, a particular user language from the available user languages using the graphical control;

computer readable code devices providing an outgoing message in the particular user language from the user in the conversation group;

computer readable code devices for translating the outgoing message from the particular user language to the conversation language when the conversation language is not the same as the particular user language, said computer readable code devices for translating operate to at least select one of a plurality of translators based on the particular user language and the conversation language, and translate the outgoing message from the particular user language to the conversation language using the selected one of the translators; and computer readable code devices for subsequently transmitting the outgoing message to the certain of the computers associated with each of the users of the conversation group, wherein the one of the users in the conversation group is able to participate in the common text-based on-line conversation using the particular user language which is different than the conversation language in which the on-line conversation uses.

11. A computer readable medium as recited in claim 10, wherein said computer readable medium further comprises:

computer readable code devices for receiving an incoming message in a conversation language from one of the users in the conversation group;

computer readable code devices for translating the incoming message from the conversation language to the user language when the conversation language is not the same as the user language.

12. A computer readable medium as recited in claim 11, wherein said computer readable medium further comprises computer readable code devices for displaying the incoming message to the user after translation, and computer readable code devices for displaying the outgoing message to the user after translation.

13. A computer readable medium containing program instructions for providing multilingual text-based conversations over a network, said computer readable medium comprising:

computer readable code devices for providing a conversation group of users having computers within the network, each of the users of the conversation group participating in a common text-based on-line conversation in a conversation language, and each of the users of the conversation group having an associated user language;

computer readable code devices for providing an outgoing message from one of the users of the conversation group, the outgoing message being in the user language associated with the one of the users of the conversation group;

computer readable code devices for displaying the outgoing message in the user language on a display screen of the user's computer;

computer readable code devices for displaying a translate button for the user to request translation of the outgoing message from the user language to the conversation language, the translate button being displayed on the display screen of the user's computer;

computer readable code devices for translating the outgoing message from the user language to the conversation language when the user selects the translate button being displayed on the display screen of the user's computer, said computer readable code devices for translating operate to at least select one of a plurality of translators based on the user language and the conversation language, and translate the outgoing message from the user language to the conversation language using the selected one of the translators; and computer readable code devices for subsequently transmitting the outgoing message to the certain of the computers associated with the users of the conversation group.

14. A computer readable medium as recited in claim 13, wherein the network is the Internet, and wherein the conversation group for the common text-based conversation is an on-line chat group.

15. A computer readable medium as recited in claim 14, wherein said computer readable medium further comprises:

computer readable code devices for displaying the outgoing message in the conversation language on the display screen of the user's computer following said translation.

* * * * *